Aug. 31, 1937.  F. S. WHITE ET AL  2,091,574

SEAL FOR CIRCULATORS AND THE LIKE

Original Filed Dec. 10, 1935

INVENTORS
FORREST S. WHITE
CLAUDE G. BORDEAUX
By David L. Ward
ATTORNEY

Patented Aug. 31, 1937

2,091,574

UNITED STATES PATENT OFFICE 2,091,574

SEAL FOR CIRCULATORS AND THE LIKE

Forrest S. White, Hoosick Falls, and Claude G. Bordeaux, Albany, N. Y.

Application December 10, 1935, Serial No. 53,778
Renewed January 21, 1937

3 Claims. (Cl. 286—11)

Difficulty has hitherto been experienced with casings containing liquid which may be under pressure as is the case with water circulators because of the leakage of water from the casing in which the water is present under pressure, outwardly along the shaft which extends through the casing, to the outside of the casing.

In accordance with our invention a liquid tight seal is provided around the shaft and outside of the casing by a device which is both simple and efficient and which overcomes the foregoing difficulty.

Our invention will best be understood by reference to the accompanying drawing in which we have illustrated a preferred embodiment thereof and in which Fig. 1 is a perspective view partially broken away and in section;

Like reference characters indicate like parts throughout the drawing.

Figure 1:
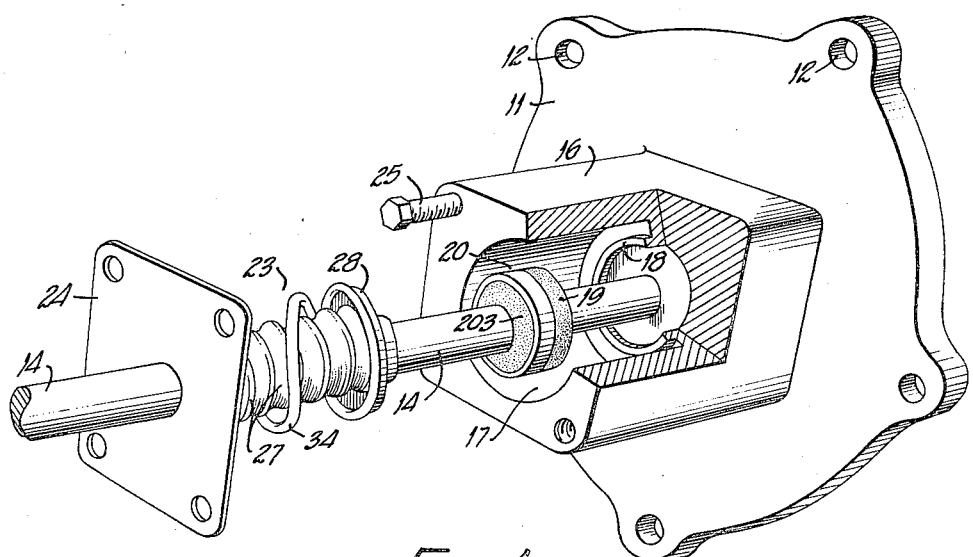
Figure 4:
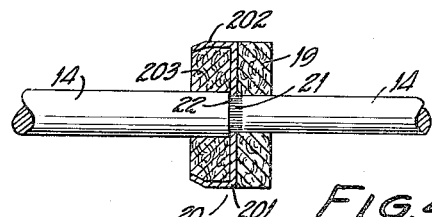
Fig. 4 is a side view of a portion of the shaft and certain parts mounted thereon.
Figure 3:
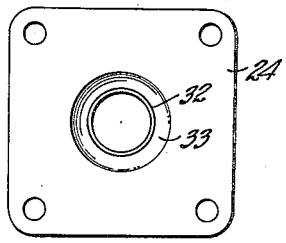
Fig. 3 is a front view of the cover for the chamber.

Referring to the drawing, 10 is a portion of a casing for a water circulator or the like in which water or other liquid may be contained under pressure and comprising an outwardly extending flange 101. A cover 11 for the casing of the circulator or the like may be secured thereto as by bolts 111 passing through openings 12 in the cover and registering with openings in the casing of the circulator, it being understood that a suitable gasket may be interposed between the two. The cover may be considered as a part of the casing. The cover is provided with an opening 13 through which passes a shaft 14, a bearing insert 15 preferably being interposed between the shaft and the wall of the cover surrounding the shaft. The cover is provided with an outwardly extending hub or member 16 recessed at its outer end and around the shaft as at 17, and provided at the bottom of the recess with an outwardly extending ring or rib 18 preferably integral with the cover and which is engaged by a disc 19 mounted on the shaft and preferably formed of a composition composed of linen or the like impregnated with "bakelite", a composition which is well known in the art, and which is capable of forming a liquid tight seal with a metal bearing surface. It is also tough and well suited to withstand the rough usage to which it is subjected and is impervious to liquid.

Also mounted upon the shaft 14 adjacent to the disc 19 is a first sealing element indicated generally at 20 and comprising a cup shaped metal member 201 provided with a forwardly extending peripheral flange 202 and also comprising a material 203 filling the cup shaped member and preferably composed of linen impregnated with "bakelite" of the same character as the disc 19. The cupped member 201 is provided with an opening through which the shaft passes and which forms a liquid tight seal therewith. The sealed joint between the shaft and the cupped member is preferably formed by providing upstanding knurls 21 on the portion of the shaft on which the member 201 is received so that when the cupped member which forms a tight fit on the shaft is forced over the knurled portion, a liquid tight seal is formed between the two. The shaft is preferably formed with a shoulder 22 against which the member 201 is seated.

A liquid tight seal is formed between the flange 202 of the element 20 and the material with which the cupped member is filled preferably in the following manner. The cupped member 20 is filled with the material which is then forced onto the knurled portion of the shaft and against the shoulder 22 before these parts are assembled in the machine. The shaft is then centered and rotated about its axis and the outer edge of the flange is swaged inwardly by rotating the shaft and the sealing element which has been mounted thereon, and by holding a suitable tool against the forward and outer edge of the rotating flange 202 so that the forward portion of the flange is swaged inwardly against the material in the cupped member with sufficient force to form a liquid tight seal between the flange and the material 203. The swaging operation, therefore serves at the same time to hold the material 203 firmly in the cupped member and at the same time forms a liquid tight seal between the flange and the material 203 and a stationary ring which will be hereinafter described and for a purpose which will more fully hereinafter appear.

Surrounding the shaft 14 beyond the first sealing element 20 is a second sealing element indicated generally at 23 and comprising a closure plate 24 which is adapted to engage the front face of the hub 16, and which is secured thereto as by screw studs 25, a gasket 26 (Fig. 2) being interposed between the closure plate and the said face of said hub. The second sealing element also comprises a "Sylphon" bellows 27 which is interposed between the cover plate 24 and the first sealing element 20. The "Sylphon" bellows is sweated or otherwise secured at its rear end to a ring 28 to form a liquid tight joint therewith. The ring is preferably formed of an alloy which may have the approximate composition 15% lead, 85% copper and 2% zinc, although it will be understood that the ring may be formed of any desired material that forms a good permanent liquid tight joint with the first sealing element 20. The ring is provided with a rearwardly extending flange 29 the edge of which engages the material 203 in the cupshaped member. The flange is urged against the material in a manner which will be more fully hereinafter described, and forms a liquid tight seal therewith, the flange 29 surrounding the shaft 14 and the inner portion of the ring preferably being bevelled outwardly so that the bearing surface of the ring against the material 203 is somewhat removed from the inner edge thereof. The ring 28 is also provided with a forwardly extending flange 30 within which is received the rear end 31 of the "Sylphon" bellows, the two forming a liquid tight joint, preferably by being sweated together as at 32 to the closure plate 24 which is preferably upset, as at 33, to form a seat for one end of a coil spring 34 which is interposed between the closure 24 and the ring 28 and forces said flange 29 on said ring against the material 203. The flange 30 and the outer surface formed by the upset portion of the closure 24 are concentric with the axis of the shaft which ensures the spring being concentric with the shaft and prevents the spring from rubbing against the outer portion of the "Sylphon" bellows 27 which is also concentric with the axis of the shaft. The spring which is normally under tension serves to hold the flange 29 of the ring 28 against the bearing surface of the material 203 at a uniform pressure. It will, of course, be understood that means such as a pulley will be mounted on the outer end of the shaft 14 for driving the same and that when the device is used with a water circulator, a propeller or the like will be mounted on the inner end thereof. As these devices constitute no part of our invention they have not been illustrated.

Figure 2:
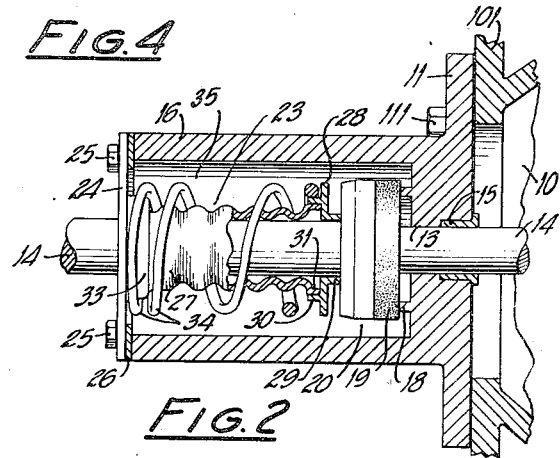
Fig. 2 is an axial section through the device shown in Fig. 1.

It will be noted that when the parts are assembled in the position illustrated in Fig. 2, a chamber 35 is formed within the hub 16 and outside of the "Sylphon" bellows, which chamber is closed by the cover 24.

As the first sealing element 20 forms a liquid tight seal with the shaft, and as the disc 19 forms a substantially liquid tight seal with the ring 18, any liquid leaking past the disc 19 would flow between the shaft and the disc 19, and outwardly between the disc 19 and the first sealing element 20 to the chamber 35 which, it will be observed, is sealed except for the leakage between the disc 19 and the first sealing element 20, and possibly a slight amount of leakage between the ring 18 and the disc 19. The water thus flowing between the shaft 14 and the bearing in which it is mounted serves to lubricate the shaft and its bearing. The chamber 35 may, of course, be filled with lubricating material which is confined therein.

In the absence of the seal embodying our invention, it is obvious that the water, which is under pressure, in the circulator would follow along the shaft to the outside of the casing which would result in loss of the amount of water in the system, which amount should be maintained substantially constant. Furthermore such loss would also result in producing an unsightly appearance in the vicinity of the circulator.

While we have described our invention in its preferred embodiment, it is to be understood that the words which we have used are words of description and not of limitation. Hence, changes within the purview of the appended claims may be made without departing from the true scope and spirit of our invention in its broader aspects.

What we claim is:

1. In a device of the character described, a casing defining a chamber in which liquid may be present under pressure, said casing being provided with an opening, a rotatable shaft extending through said opening and having its bearing therein, a sealing element for said shaft comprising a metallic disc mounted on said shaft non-rotatably with respect thereto, said disc being provided with an axially extending peripheral flange forming a cup shaped member filled with compressed fibrous material presenting a free bearing surface, said sealing element also comprising a non-rotatable ring sealed to the casing and having its bearing against said free bearing surface of said fibrous material.

2. In a device of the character described, a casing defining a chamber in which liquid may be present under pressure, said casing being provided with an opening, a rotatable shaft extending through said opening and having its bearing therein, and sealing means for said shaft comprising a first and a second disc engageable with each other and mounted on said shaft non-rotatably with respect thereto, said second disc comprising a metallic plate provided with an axially extending peripheral flange forming a cup shaped member filled with compressed fibrous material, the respective discs presenting oppositely disposed free bearing surfaces, said casing being provided with a first non-rotatable annular ring engageable with the free bearing surface of said first disc, and a second non-rotatable annular ring engageable with the free bearing surface of said second disc.

3. In a device of the character described, a casing defining a chamber in which liquid may be present under pressure, said casing being provided with an opening, a rotatable shaft extending through said opening and having its bearing therein, a sealing element for said shaft comprising a metallic disc mounted on said shaft non-rotatably with respect thereto, said disc being provided with an axially extending peripheral flange forming a cup shaped member filled with compressed fibrous material presenting a free bearing surface and the free edge of said peripheral flange being turned inwardly sufficiently to form a liquid tight seal with said compressed fibrous material, said sealing element also comprising a non-rotatable ring sealed to the casing and having its bearing against said free surface of said fibrous material.

FORREST S. WHITE.
CLAUDE G. BORDEAUX.